(No Model.)
S. SCHROYER.
CAR AXLE BOX.
No. 566,475. Patented Aug. 25, 1896.
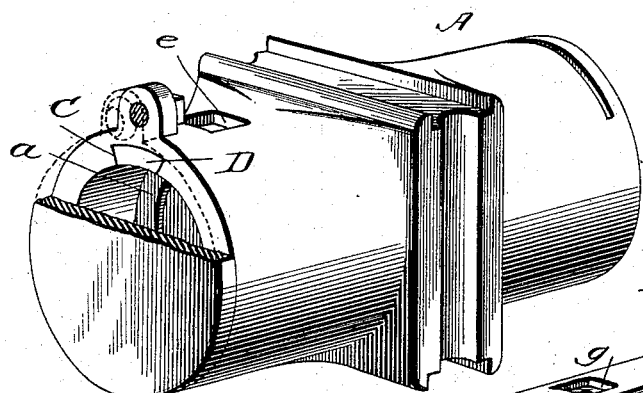
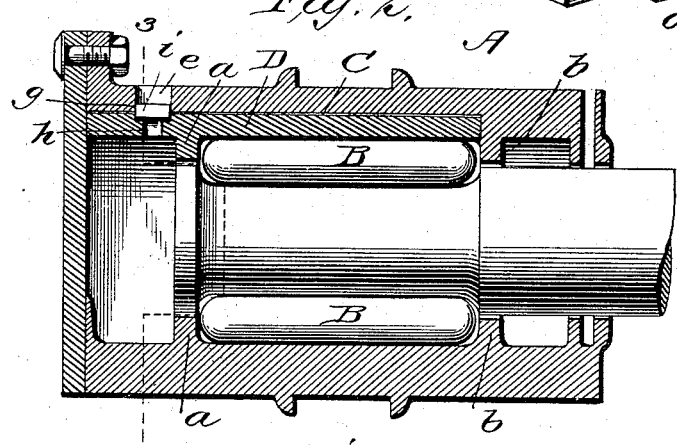
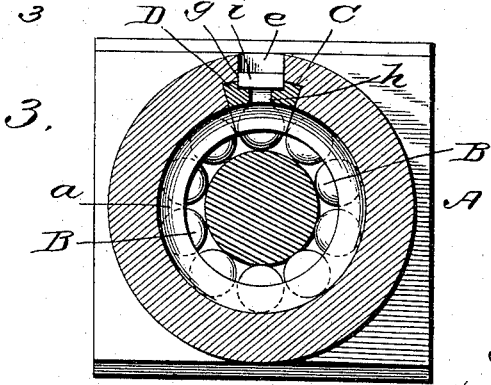
Witnesses
Inventor
Stephen Schroyer
by Frank E Rapp
his Attorney

UNITED STATES PATENT OFFICE.

STEPHEN SCHROYER, OF POTTSTOWN, PENNSYLVANIA, ASSIGNOR OF ONE-HALF TO SILAS S. RAPP, FRANK W. COPELAND, GEORGE A. KRAUSE, AND JOHN W. HALTEMAN.

CAR-AXLE BOX.

SPECIFICATION forming part of Letters Patent No. 566,475, dated August 25, 1896.

Application filed April 11, 1896. Serial No. 587,160. (No model.)

*To all whom it may concern:*

Be it known that I, STEPHEN SCHROYER, a citizen of the United States, residing at Pottstown, in the county of Montgomery and State of Pennsylvania, have invented certain new and useful Improvements in Car-Axle Boxes, of which the following is a specification, reference being had therein to the accompanying drawings.

My invention relates especially to boxes for receiving the journals of car-axles, although the invention may be found useful in any instance where an antifriction bearing or box may be desired for the journal of a shaft.

My invention consists of the parts and the construction and combination of parts forming the improved journal-box, as I shall hereinafter fully describe and claim.

In the accompanying drawings, forming part of this specification, Figure 1 represents a perspective view of one form of car-axle box embodying my invention. Fig. 2 is a longitudinal sectional view of the same. Fig. 3 is a cross-sectional view on the line 3 3 of Fig. 2. Fig. 4 is a perspective view of the key removed.

The external configuration of the box A may be cylindrical, square, rectangular, or of other desired form, and it will be such that the box may be applied to any of the truck-frames or running-gear of railway-cars or other vehicles. In the present instance the box is shown as having cylindrical ends and a squared central portion to receive the loops, rods, bolts, or other well-known appliances for securing the box securely in position. The interior of the box has a chamber of substantially uniform diameter to receive the journal of the axle. This interior is formed with two flanges $a$ $b$, and between these flanges in annular series are placed antifriction-rollers B, with ends abutting against the flanges and rounded to reduce the friction of the ends to a minimum. The rolls preferably occupy the entire space between the journal and inner wall of the chamber and they serve as an antifriction-bearing for the journal. In order that the rolls may be inserted in position and removed from their chamber when desired, I provide a simple means by which said rolls are inserted and removed endwise. To accomplish this result, I form one of the inner walls of the box with a groove C, preferably dovetailed in cross-section, which extends from the outer end of the box inward to a point near the innermost flange $b$, this groove extending past and removing a portion of the flange. In the groove thus formed I place a key D, whose cross-section corresponds with the form of the groove, whereby the key is prevented from dropping out, said key being of such thickness that when it is inserted and is fully in place its inner face is flush with and forms a continuation of the inner wall of the ball-chamber, said key being also formed with a lug $d$, corresponding in shape and adapted to occupy and fully close the cut-away portion of the flange $a$ and thereby close the entrance of the ball-chamber formed between the inner side of the box and the journal. When the key is withdrawn, which is done by pulling it out endwise, the chamber is exposed and the rolls are inserted and removed through the opening or groove which the key normally occupies. This makes a very simple and effective method of introducing and removing the rolls without withdrawing the axle from the box.

In some forms of axles a laterally-swinging door is used to cover the entrance to the box, it being understood that these boxes are to be supplied with packing and lubricant in the customary manner. In Fig. 1 I show such a laterally-swinging door. In this instance the door is pivoted just above and in line with the key, and the door, when closed, lies just in front of the outer end of the key and prevents the key from being accidentally withdrawn. However, to provide a positive lock for the key, especially when the box is provided with the usual hinged door, which is lifted to expose the interior of the box and end of the journal, I form in the box, near the outer end, a square or rectangular recess or hole $e$, and in the top surface of the key is made a corresponding socket or recess $g$, with a smaller recess or opening $h$ extending clear through the key. In these recesses $e$ and $g$ is adapted to be placed a square or rectangular plate $i$, which is loosely applied, and when the key is properly inserted in its recess or socket $g$, will be in alinement with the recess or opening $e$, and the loose plate will drop into the socket or recess $g$ far enough to lock the key against accidental withdrawal. To remove the key so secured, I use a hooked shaped tool, (not shown,) which is passed into the opening $h$ from below, so as to lift the loose plate out of its engagement with the key, when the latter may be readily withdrawn. Thus I provide a simple construction of car-axle box wherein the antifriction-rollers are quickly put in position and removed, and wherein the key, which controls the entrance to the ball-chamber proper, is securely locked against accidental displacement.

Having thus described my invention, what I claim as new, and desire to secure by Letters Patent, is—

1. A car-axle box having an interior chamber provided with inwardly-extending flanges the outermost one of which has a cut-away portion, said chamber having a groove extending longitudinally along it and opening out through the outer end of the box, rolls in said chamber between the flanges, having rounded ends, and a removable key to fit said groove and having a lug to be alined with and occupy the said cut-away portion of the outer flange, and complete said flange and close the chamber when the key is in place, said key being removable endwise to expose the cut-away portion and enable the rolls to be inserted and removed.

2. A car-axle box having an interior annular series of rolls to be introduced endwise through one end of said box, a slidably-mounted key to confine the rolls in place, and means for locking the key in position consisting of a loose plate fitted in an opening in the box above the key and adapted to partially enter a recess or socket in the adjacent side of the key when the socket and opening are in alinement and thereby prevent end movement of the key.

In testimony whereof I affix my signature in presence of two witnesses.

STEPHEN SCHROYER.

Witnesses:
 E. B. ROSSITER,
 W. H. MAXWELL.